(No Model.)

S. W. MAQUAY.
PRIMARY BATTERY AND PORTABLE ELECTRIC LAMP.

No. 527,436.  Patented Oct. 16, 1894.

2 Sheets—Sheet 1.

WITNESSES.

INVENTOR.

Samuel William Maquay (No Model.) 2 Sheets—Sheet 2.
S. W. MAQUAY.
PRIMARY BATTERY AND PORTABLE ELECTRIC LAMP.
No. 527,436. Patented Oct. 16, 1894.
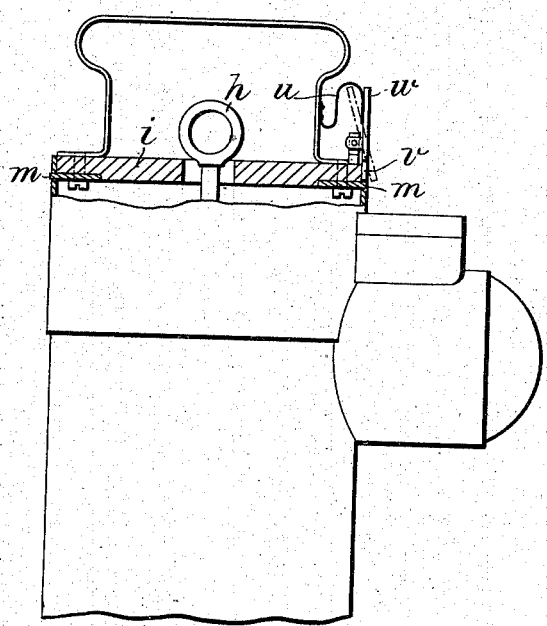
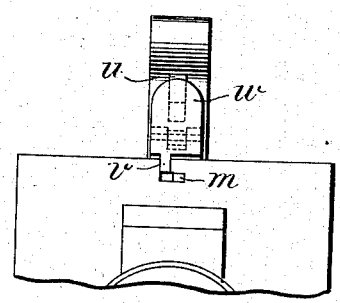
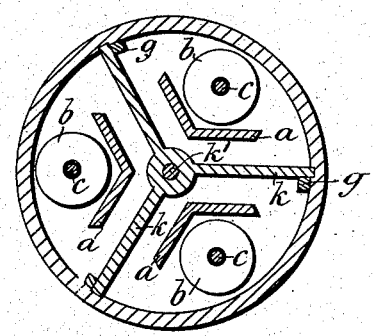
WITNESSES.
INVENTOR.

UNITED STATES PATENT OFFICE.

SAMUEL WILLIAM MAQUAY, OF LONDON, ENGLAND.

PRIMARY BATTERY AND PORTABLE ELECTRIC LAMP.

SPECIFICATION forming part of Letters Patent No. 527,436, dated October 16, 1894.

Application filed January 4, 1894. Serial No. 495,666. (No model.) Patented in England February 13, 1893, No. 3,210; in France November 17, 1893, No. 234,126; in Belgium November 23, 1893, No. 107,327; in Cape of Good Hope January 15, 1894, No. 898; in New South Wales January 29, 1894, No. 4,852; in South African Republic February 2, 1894, No. 598; in New Zealand February 5, 1894, No. 6,654; in Victoria February 9, 1894, No. 11,139, and in India April 10, 1894, No. 98.

---

*To all whom it may concern:*

Be it known that I, SAMUEL WILLIAM MAQUAY, a subject of Her Majesty the Queen of Great Britain, residing at London, in the county of Middlesex, England, have invented a certain new and useful Improvement in Primary Batteries and Portable Electric Lamps, of which the following is a specification, and for which Letters Patent have been granted as follows: in Great Britain, No. 3,210, bearing date February 13, 1893; in France, No. 234,126, bearing date November 17, 1893; in Belgium, No. 107,327, bearing date November 23, 1893; in New South Wales, No. 4,852, bearing date January 29, 1894; in New Zealand, No. 6,654, bearing date February 5, 1894; in Victoria, No. 11,139, bearing date February 9, 1894; in South African Republic, No. 598, bearing date February 2, 1894; in Cape of Good Hope, No. 898, bearing date January 15, 1894, and in India, No. 98, bearing date April 10, 1894.

My invention relates to an improvement in primary batteries and in portable electric lamps.

In many primary batteries at present in use it is customary to provide means for removing the zinc plates from the liquid when the battery is not in use in order to prevent the zincs being uselessly destroyed by the solution. Owing to the length of the zinc plates the amount of lift which is required to remove these is considerable and adds to the size and expense of the parts.

According to my invention I employ what I may term horizontally arranged zinc plates, or plates so arranged that their width is greater than their depth, such as disks of metal used on the flat. This and other improvements forming part of my invention are illustrated in the accompanying drawings which show an improved portable lamp from the cells of which the zinc plates may be removed when not in use, and which is liquid tight.

Figure 1:
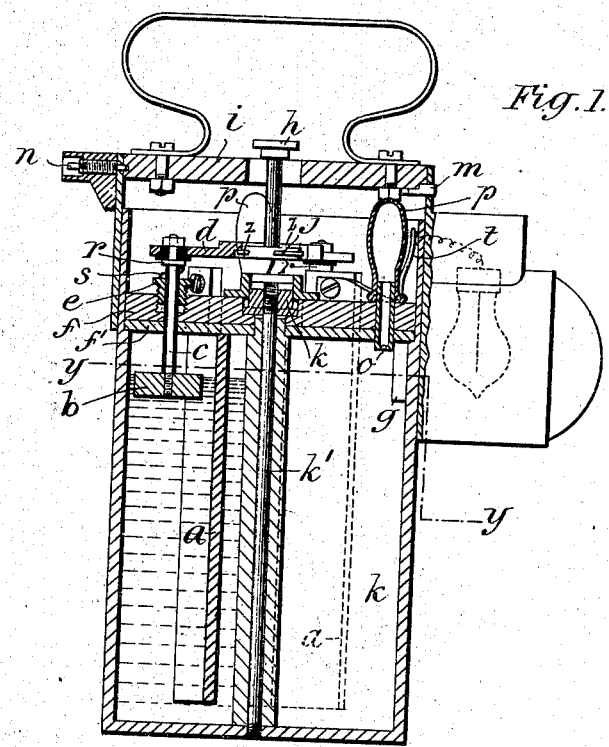
Figure 2:
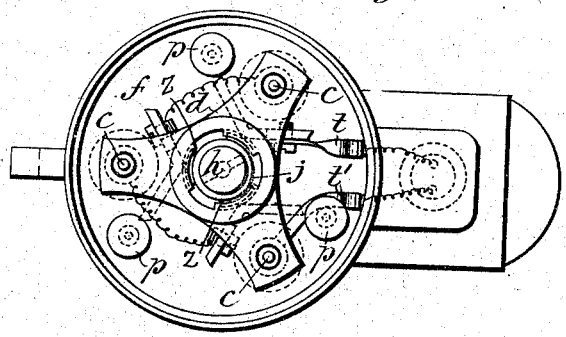

Figure 1 is a sectional elevation showing my improvements applied to a combined portable battery and lamp such as would be applicable for miners' use. Fig. 2 is a plan of same with the cover removed. Fig. 3 is a plan of Fig. 1 on the line $y-y$. Fig. 4 is a side elevation of a portable lamp showing another method of holding the cover in place, and Fig. 5 a front view of a portion of same.

In the drawings a three cell battery is shown, the carbons $a$ being of angular form in section (though they may be of any convenient shape) while the zincs $b$ as shown are made in the form of disks and are carried by rods $c$ attached to a frame $d$, said rods passing through stuffing boxes $e$ carried by a plate $f$ having a sheet rubber face $f'$; the object being to prevent the liquid escaping when the battery is reversed or tilted. The disks $b$ are preferably so arranged that when the battery is in action they will be just under the surface of the solution which is the point where the liquid is most active, and this object may be attained by securing a small block $g$ inside the wall of each cell, such block indicating the height to which the cell is to be filled. The frame $d$ and zincs $b$ may be arranged to be raised and lowered in various ways, but I prefer to employ the stuffing boxes $e$ which when properly packed permit the zincs to be moved up and down and to remain in the desired position. For the purpose of operating this frame from the outside a stud or handle $h$ passing through the cover $i$ may be employed, the shank of said stud carrying a disk $j$ having three lugs $z, z$, on its edge which pass under projections arranged around a central opening in the frame $d$. By dropping this disk $j$ into the opening and turning it partly around it will engage with the projections, and the frame may be raised and lowered by means of the stud or handle thus affording a means of turning on and off the light. By releasing the disk $j$ from the frame, the opening left in the latter will enable a screw driver, wrench or tool to be passed through it for the purpose of reaching the nut $k$. This nut screws upon the rod $k'$ secured in the center of the battery, and as will be seen serves to secure the plate $f$ which closes the cells. The nut $k$ is arranged so that while it may be released from the rod $k'$ it need not be wholly removed therefrom. This may be effected by leaving a flange on the base of the nut $k$ and allowing the nut a certain amount of play in a recess in the plate $f$, a flanged ring $l$ secured to the plate preventing the nut from being entirely removed.

As shown in Fig. 1 the cover $i$ is secured in place by a fixed stud $m$ and a screw $n$, the former passing into the casing and the latter passing from a block on the outside of the casing on to the cover, the screw being turned by a key to lock or unlock the cover.

It is necessary in batteries of this class to provide means for the escape of gas from the solution and this may be done by means of a tube or passage $o$ in the plate $f$ for each cell. With this arrangement however there is a danger of the liquid escaping when the battery is tilted, and thus corroding the connections. To avoid this I place over the tubes $o$ receptacles $p$ provided with a small perforation or pin holes to allow for the escape of the gas generated, the receptacle holding the liquid if any escapes from the tube $o$ when the battery is tilted and allowing it to run back into the cell when the battery is held vertically again. These receptacles are preferably of india rubber.

The rods $c$ are of metal but cased with vulcanite to prevent their being corroded by the liquid or gases, the metal portion being in contact with a metal ring $r$ suitably insulated from the frame $d$ as is also the metal portion of the rod passing through said frame. To the metal ring $r$ is soldered a short piece of spring $s$ which makes contact with the metal stuffing box $e$.

The connections will be readily understood by persons familiar with batteries of this class, and also by reference to Fig. 2, from which it will be seen that the zinc of one cell is connected through the stuffing box $e$, as before explained, with the carbon of the other cell next in order, such connections being made by metal strips or wires, the carbon of the last cell being in connection with the spring strip $t$ (Figs. 1 and 2), while the zinc of the first cell is in connection with the strip $t^x$. Each of these strips makes a spring contact with studs in the case of the battery, such studs forming the lamp terminals.

In Figs. 4 and 5 the lid or cover $i$ carries two fixed studs $m$ at opposite points, such studs holding in slots in the case after the fashion of a bayonet joint. To prevent the cover coming off by an accidental turn of the handle a stud $v$ is pivoted to the front of the handle, such stud dropping into the vertical portion of the slot, but being capable of removal therefrom by pressure upon a thumb piece $w$ provided with a spring $u$ which will remove the stud $v$ from the slot and allow the lid to be turned.

What I claim is—

1. In a primary battery and in combination, the cells, a frame adapted to be easily raised or lowered, insulated rods attached to said frame, a liquid-tight plate carrying stuffing boxes, through which said rods pass and zincs in the form of plates or dies, carried on the flat by said rods, substantially as and for the purpose set forth.

2. In a primary battery and in combination the cells, a liquid tight plate over same, the carbons, stuffing boxes carried by the plate, means for securing the latter, a frame, insulated rods attached to the frame passing through the stuffing boxes and plate, zincs carried by the rods, a cover and a handle passing through same and engaging with the frame for raising and lowering same, substantially as described.

3. In a primary battery and in combination the cells, a liquid tight plate over same, means for securing the plate, a frame, rods attached thereto passing through the plate, disks of zinc horizontally carried by the rods, means for raising and lowering the frame and zincs, a cover, the case, terminals carried by the case, spring strips carried by the plate making contact with the terminals, connections between the strips and the zincs and carbons and an incandescent lamp connected to the terminals and carried by the case substantially as described.

4. In a primary battery the combination with the cells, of a liquid tight plate covering same, means for securing the plate, a tube or passage in the plate to allow of the escape of gas from each cell, and an elastic receptacle provided with a small opening or pin hole in same, carried by the tube, substantially as and for the purpose described.

In testimony whereof I have hereunto set my hand in the presence of two subscribing witnesses.

SAMUEL WILLIAM MAQUAY.

Witnesses:
 PHILIP M. JUSTICE,
 ALLEN PARRY JONES.